May 4, 1943.　　　　　　J. H. BUSHMAN　　　　　　2,318,371
STORAGE BATTERY
Filed Jan. 29, 1941　　　　　　3 Sheets-Sheet 1

INVENTOR.
BY　JULIUS HAROLD BUSHMAN
Kwis Hudson & Kent
ATTORNEYS

May 4, 1943. J. H. BUSHMAN 2,318,371
STORAGE BATTERY
Filed Jan. 29, 1941 3 Sheets-Sheet 2

INVENTOR.
JULIUS HAROLD BUSHMAN
BY Kwis Hudson & Kent
ATTORNEYS

May 4, 1943.                J. H. BUSHMAN                2,318,371
STORAGE BATTERY
Filed Jan. 29, 1941                3 Sheets-Sheet 3
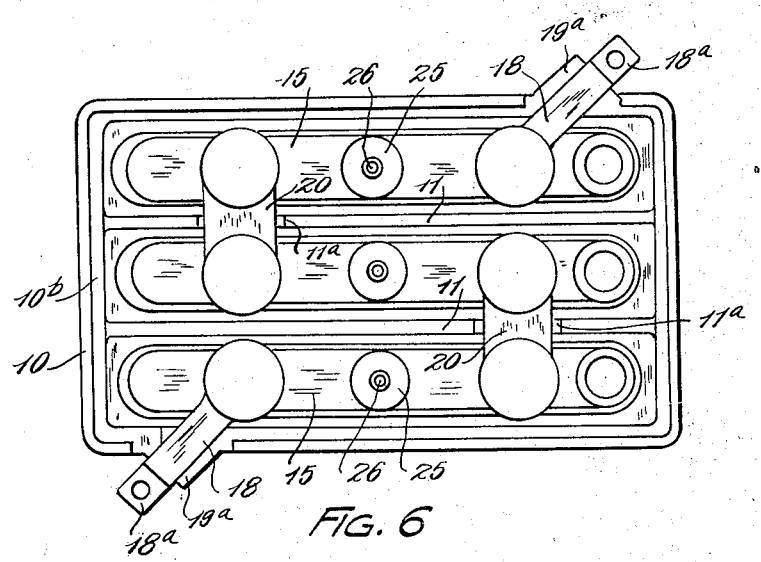
FIG. 6
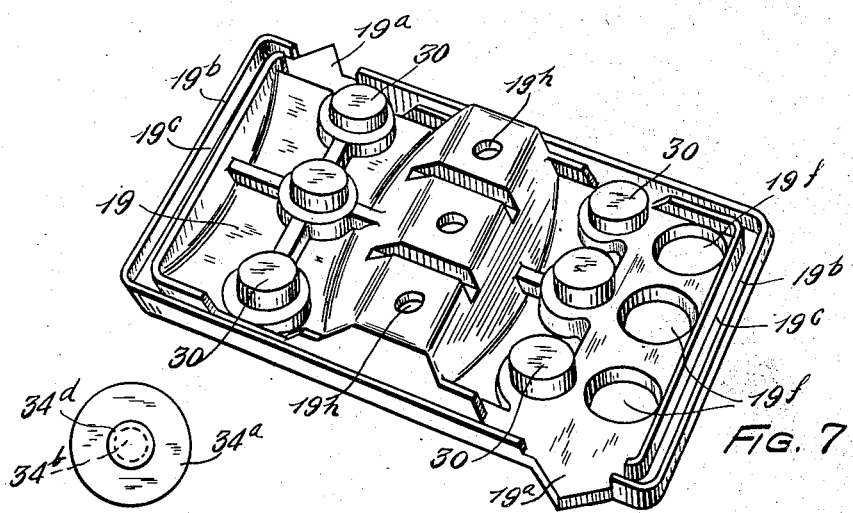
FIG. 7
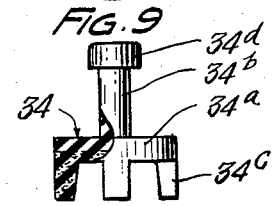
FIG. 9
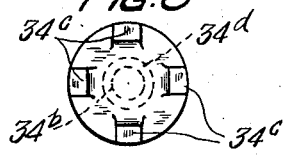
FIG. 8
FIG. 10
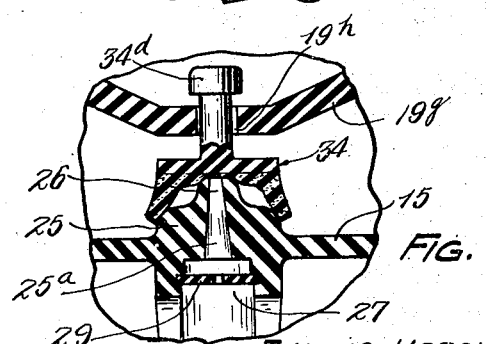
FIG. 11
INVENTOR.
JULIUS HAROLD BUSHMAN
BY Kwis Hudson & Kent
ATTORNEYS Patented May 4, 1943

2,318,371

UNITED STATES PATENT OFFICE 2,318,371

STORAGE BATTERY

Julius Harold Bushman, Willoughby, Ohio, assignor to Willard Storage Battery Company, Cleveland, Ohio, a corporation of West Virginia Application January 29, 1941, Serial No. 376,500

7 Claims. (Cl. 136—170)

This invention relates to storage batteries and has particular reference to batteries provided with auxiliary covers, such as motorcycle batteries of the general type disclosed in an application for Letters Patent of the United States filed December 27, 1939, in the name of Robert M. Raney, Serial No. 311,180, now Patent No. 2,232,800 granted February 25, 1941.

In the Raney application there is disclosed a battery with an auxiliary cover which extends entirely over the top of the battery and which, in addition to serving as a dust shield and as a protector for the cell covers and the parts carried thereby, admits of the ready and convenient filling of the cells without danger of overfilling. The Raney battery has the following features of construction: The cell covers are provided near one end of the battery with filling wells which are adapted to be closed by removable filler plugs, and said cell covers are provided also, near the transverse center line of the battery, with a series of separate vent openings formed in the upper ends of protuberances which are molded in and project upwardly from the cell covers. The auxiliary cover has adjacent one end thereof a series of openings which afford access to the filler plugs carried by the cell covers, and to avoid overfilling the auxiliary cover is provided with means for closing the vent opening of each cell while it is being filled. This is accomplished by providing the auxiliary cover with a transversely extending depressed portion in the bottom of which are arranged flexible dome-shaped caps which are arranged directly above the vent openings of the different cell covers in a manner such that the operator may, by depressing these caps, close the vent openings beneath them so as to trap air on the underside of the cover of the cell being filled and thus prevent overfilling.

The principal object of the present invention is to provide a battery of the general type disclosed in the Raney application but provided with novel and efficient means different than embodied in the Raney construction for closing the vent openings of the various cell covers during filling.

The invention may be further summarized as consisting in certain novel details of construction and combinations and arrangements of parts which will be described in the specification and set forth in the appended claims.

In the accompanying sheets of drawings wherein I have shown the preferred embodiment of the invention, Fig. 1 is a vertical sectional view of a battery constructed in accordance with my invention, the section being taken along the line 1—1 of Fig. 4;

Fig. 6 is a plan view of the battery with the auxiliary cover removed;

Fig. 7 is a perspective view of the underside of the auxiliary cover;

Fig. 8 is a side elevation, partly in section, of a valve one of which is provided for each cell of the battery for closing the vent opening thereof during filling, the valve being adapted to be supported by the cell cover but having a stem projecting through the auxiliary cover and accessible from the top thereof;

Figs. 9 and 10 are top and bottom views respectively of said valve; and

Fig. 11 is a fragmentary sectional view showing the valve for one of the cells of the battery depressed so as to close the vent opening of the cell, the parts shown in Figs. 8 to 11 being on a somewhat enlarged scale.

Figures 1, 2:
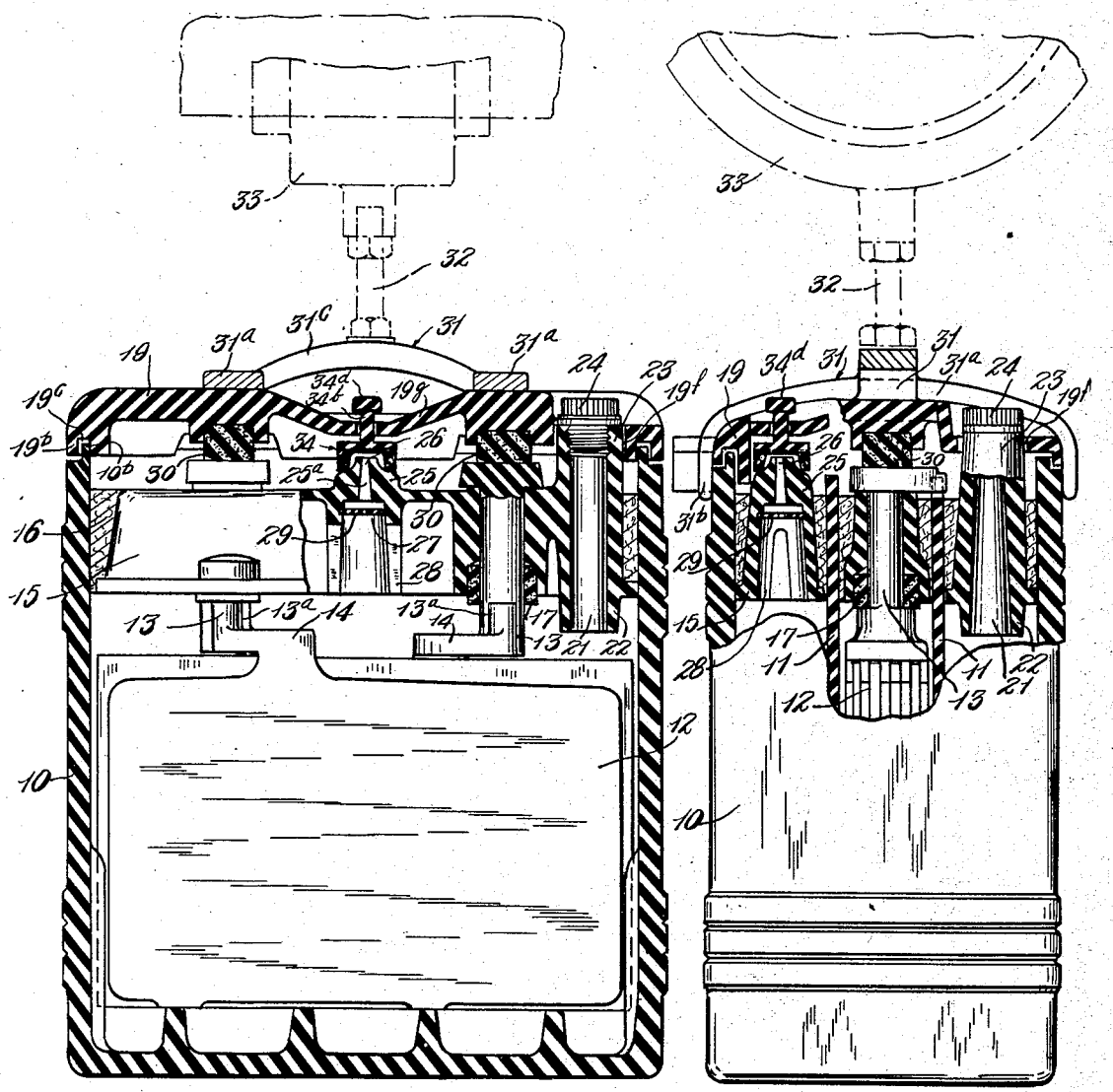
Fig. 2 is a view partly in elevation and partly in section, the section being taken along the irregular line 2—2 of Fig. 4.

Referring now to the drawings, 10 represents a battery box which may be molded from hard rubber or other suitable composition and which is provided in the case of a multi-cell battery with the usual integrally molded partitions 11 (Figs. 2 and 6) dividing the battery box into cell compartments. The battery may have any number of cells, a three-cell battery being here illustrated. Each cell compartment is provided with a battery element 12 from which extend as usual the two cell posts 13 formed on straps 14 each connected to the plates of one polarity. Each cell is closed by a cell cover 15 which is fitted into the top portion of the compartment and is sealed therein in the customary manner by sealing compound 16. The top of the cover is below the upper edge of the case 10 so as to provide a space for the intercell connectors, the main terminals, and certain other parts to be referred to.

The two posts 13 of each cell may be sealed in the covers 15 in any of the customary ways, but, as here shown, they extend through rubber sealing bushings 17 fitted into recesses formed on the undersides of the covers. In this instance, the covers 15 are positioned in the upper portions of the cell compartments by the engagement of the lower ends of the bushings 17 with shoulders 13a formed on the lower portions of the posts 13. By reference to Fig. 6 it will be seen that the posts at two of the diagonally opposite corners of the battery have terminal members 18 lead-burned thereto, these having extensions 18a constituting the main terminals of the battery which project diagonally outward through slots or openings formed partly in extensions 10a of the sides of the case 10 near diagonally opposite corners and partly in extensions 19a of the auxiliary cover 19 to be referred to presently. The other cell posts are lead-burned to intercell connectors 20 the middle portions of which extend through notches 11a formed in the upper portions of the partitions 11.

Referring again to the cell covers 15 which, in this instance, are deeper and narrower than the usual cell covers, each of these covers has at one end a filling opening or well 21 formed in a tubular portion of the cover with a skirt-like extension 22 on the underside of the cover and extending down to substantially the normal electrolyte level of the cell and with an extension 23 which projects above the top of the cover and is internally threaded near its upper end to receive the threaded shank of a removable filler plug 24. The filling openings 21 with the tubular extensions 22 and 23 for the various cells are arranged in a row near one end of the battery. Additionally, each cell cover is provided about centrally and on the upper side thereof with an upwardly extending protuberance 25 having a passageway 25a extending therethrough and terminating at its upper end in a small vent opening 26. The passageway 25a is preferably tapered although I do not regard this as essential. The lower end of this passageway is enlarged to form a condensing chamber 27, and below this condensing chamber formed on the under or inner side of the cover is a slotted skirt portion 28. The condensing chamber may have one or more perforated baffles 29 extending across the same as shown in Figs. 1 and 2. The protuberances 25 with the vent openings 26 are arranged in a row extending transversely of the battery centrally thereof.

Figure 3:
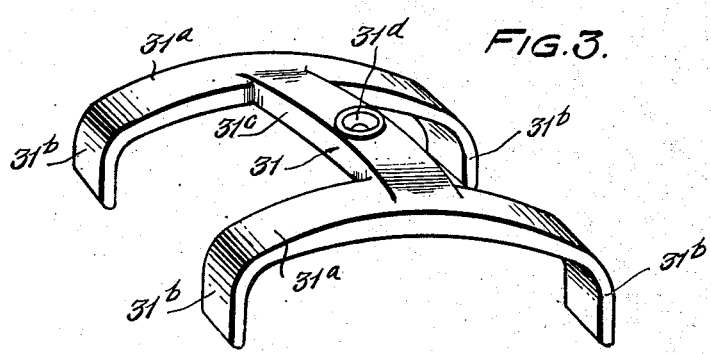
Fig. 3 is a perspective view of a clamp which in this instance is used to fasten the auxiliary cover in place.

Reverting to the auxiliary cover 19 to which reference was made previously, this cover, like the cell covers 15, is preferably molded from hard rubber composition or other suitable material which on curing becomes hard and is inert to the battery electrolyte. This auxiliary cover extends over the entire top of the battery and is provided around its perimeter with a downturned flange 19b which conforms in outline to that of the top of the battery with which it is in telescoping interfitting relation. In this instance, the underside of the flange is provided with a groove 19c which receives a rib 10b formed on the top edge of the battery case 10. Preferably the auxiliary cover and the top of the case are not clamped in direct firm engagement but, instead, a cushion is provided between the underside of the auxiliary cover and the top of the battery proper. In this instance, this cushion consists of soft rubber pads or buttons 30 fitted into recesses molded into the underside of the auxiliary cover and arranged so as to engage the upper ends of the cell posts of the battery. Preferably the cover is provided with as many of these pads as there are cell posts in the battery, and since a three-cell battery is here illustrated, the cover here shown has six pads. The auxiliary cover 19 may be secured or clamped in place by any suitable means, but in this instance there is employed a metal clamp 31 which, as illustrated in Fig. 3, is substantially H-shaped having two cover engaging arms 31a which extend transversely over the top of the auxiliary cover and are provided with downturned ends 31b which extend downwardly below the marginal flange of the auxiliary cover and engage opposite sides of the battery case, as illustrated in Fig. 2. Additionally, the clamp is provided with a cross-bar 31c which in this instance is provided with a central depressed seat 31d to accommodate the lower end of a cover holding and battery clamping stud 32 adapted to engage a suitable part 33 carried by the motorcycle or forming a part of the frame thereof.

It is desirable, of course, that access be had to the filler plugs without disturbing the auxiliary cover 19 or the clamp 31 therefor, and, accordingly, the auxiliary cover is provided with a row of openings 19f to accommodate the upper ends of the tubular extensions 23 of the filling openings or at least the knurled portions of the filler plugs 24 which are arranged at one end of the battery. At this end of the battery, the auxiliary cover has a lowered flattened portion 19d with ribs 19e (Figs. 4 and 5) extending between the filler plugs, thus providing protecting walls which reduce the likelihood of injury to the protruding portions of the plugs.

The middle portion of the auxiliary cover has on the upper side a trough-like depression 19g extending transversely across the same, this depression having sloping sides, upright ends located adjacent the downturned margin of the auxiliary cover, and a substantially flat bottom which is located directly above the transverse row of vent openings 26 in the protuberances 25 formed in the cell covers and spaced a suitable distance therefrom.

Figure 4:
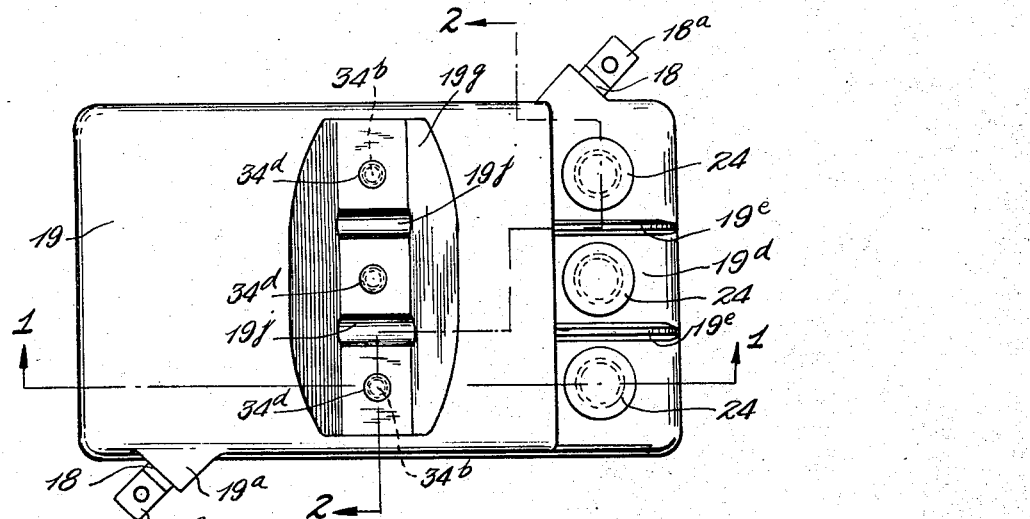
Fig. 4 is a plan view of the battery with the auxiliary cover in place.
Figure 5:
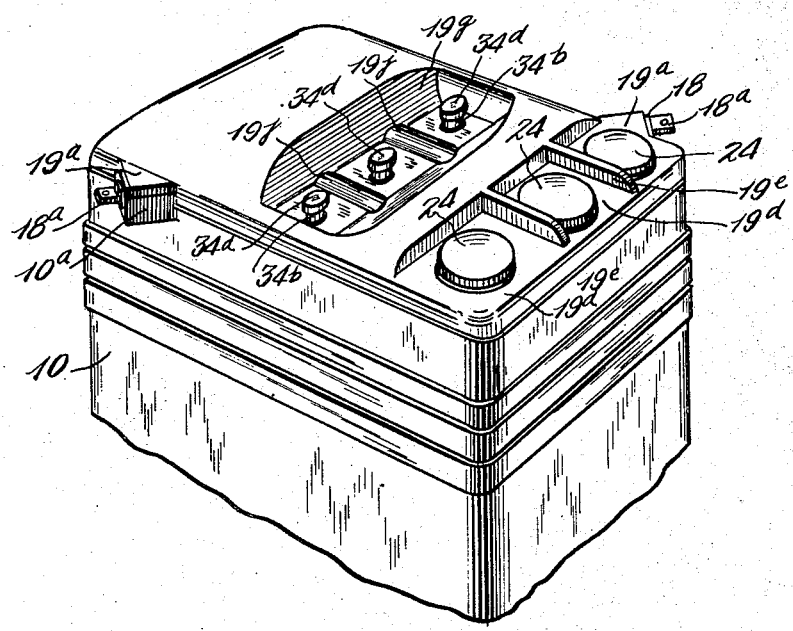
Fig. 5 is a perspective view of the upper part of the battery.

As before stated, in the Raney construction the vent openings are adapted to be closed by flexible dome-shaped caps, and these are held in place by suitable interfitting grooves and ribs formed on the base portions of the caps and the walls of the openings which receive them, but in my construction a different vent closing means is provided and the same will now be described. For closing the vent openings I employ depressible valve members which are supported by the cell covers and preferably by the vent protuberances 25 of the cell covers but which are accessible above the bottom of the depressed portion 19g of the auxiliary cover. These valve members, which are shown detached at 34 in Figs. 8, 9, and 10, may be formed of any suitable material inert to the battery electrolyte, such as rubber. They are provided with a disk-like or annular body portion 34a provided at the top with a centrally disposed upstanding stem 34b and at the bottom with a plurality of spaced lugs or feet 34c projecting down from the peripheral portion of the lower side of the valve body 34a. The upper part of the body 34a and the stem 34b are firm or rigid and the lower part of the body and the feet 34c are flexible and elastic. Normally, the lower ends of the feet 34c rest on the sloping sides of the protuberances 25 of the different cell covers with the lower sides of the valve bodies 34a spaced slightly above the vent openings at the upper ends of the protuberances. At the same time the stems 34b project freely through openings 19h formed in the bottom of the depressed portion 19g of the auxiliary cover. If desired, between the openings 19h which receive the stems 34b, transverse ribs 19j may be provided, as best shown in Figs. 4 and 5.

Although when the auxiliary cover is in place the valves 34 rest on the cell covers and are freely movable with respect to the auxiliary cover by depressing the stems, as mentioned above, nevertheless they are preferably carried by the auxiliary cover so as to go with the auxiliary cover when it is applied or removed. This will prevent loss of the valves when the auxiliary cover is removed from the top of the battery for any purpose. To accomplish this result, the upper ends of the stems are preferably provided with knobs 34d which are larger than the openings 19h which receive the stems 34b. To permit the assembly of the auxiliary cover and the valves, the knobs may be cemented or otherwise attached to the valve stems 34b after they have been extended through the openings 19h of the auxiliary cover or they may be formed of soft rubber, in which event they can be vulcanized to the upper ends of the stems. In the latter case the knobs would have sufficient flexibility that they could be pushed through the openings 19h from the underside. The stems or the enlarged upper ends thereof may be colored red or have some other distinguishing color so that they can be readily located.

As the vent protuberances 25 project freely into the hollow space beneath the body portions 34a of the valves 34, the latter do not normally interfere with the venting of the cells, the venting taking place through the vent openings 26 under the valves and then into the space between the cell covers and the auxiliary cover and out from this space around the edges of the auxiliary cover or through the openings 19f and 19h around the tubular extensions 23 of the filling openings and around the valve stems 34b.

When it is desired to fill the cells, the filler plugs are removed, and when liquid is about to be supplied to a cell, the operator presses down the valve 34 for the cell being filled by depressing the stem 34b thereof which projects up through the bottom of the depressed portion 19g of the auxiliary cover, and in doing this the feet 34c of the valve are flexed and the lower part of the valve body engages the top of the protuberance and closes the vent opening 26. It will be understood that liquid will be supplied until the operator sees it rising in the filling opening. Thereupon the operator will release the valve 34 for this cell so that the flexible and elastic feet 34c will elevate the valve so as to again open the vent opening 26. This breaks the seal of the vent opening and the liquid in the filling opening will flow down into the cell and the electrolyte will assume the desired predetermined level. This is repeated for each cell, with the result that overfilling is prevented notwithstanding the presence of the auxiliary cover. Thus the filling is done as conveniently as though the top of the battery were not covered by the auxiliary cover.

It might be here stated that the clamp 31 does not interfere with the depressing of the valves 34 since the clamping arms 31a engage the auxiliary cover on opposite sides of the depressed portion 19g, and because of the fact that the stems of the valves project through the base of the depression, coupled with the fact that the central cross-arm 31c of the clamp is narrow and is bowed upwardly, easy access is afforded to all the valve stems 34b including the stem of the valve for the middle cell.

As previously stated, the valves 34 may be formed of any suitable material, such as rubber. If formed of rubber, the upper part of the valve body and the stem will be formed of hard rubber composition and the lower part of the valve body and the feet depending therefrom will be formed of soft rubber composition. While rubber is preferred, some other plastic or combination of plastics may be used in forming the hard upper part and the soft flexible lower part, and included among these other materials are the artificial rubbers sold under various trade names.

While I have shown one form of valve and one way by which access may be had to the valves from the top of the auxiliary cover, I do not desire to be confined to the precise details shown and described but aim in my claims to cover all modifications which do not involve a departure from the spirit and the scope of the invention.

Having thus described my invention, I claim:

1. In a storage battery, a container having a cell compartment, a cell cover sealed in the compartment, a battery element in the compartment having one or more terminals extending through and sealed in the cell cover, said cell cover having a normally closed filling opening with an imperforate sleeve-like extension extending down from the lower side of the cover to substantially the normal electrolyte level and having also a normally open vent opening separate from the filling opening, an auxiliary cover secured to the top of the battery and serving as a protector for the cell cover and the parts carried thereby, said auxiliary cover having a pair of openings one affording access to the filling opening, and a valve having a yieldable open lower portion, said valve at all times resting on the cell cover and having an imperforate portion located above said vent opening and a stem extending through said other opening of the auxiliary cover and serving when actuated in one direction to close said vent opening whereby the vent opening may be closed while the cell is being filled and when released serving by spring action to open the vent opening.

2. In a storage battery, a container having a cell compartment, a cell cover sealed in the compartment, said cell cover having a normally closed filling opening with an imperforate sleeve-like extension extending down from the lower side of the cover to substantially the normal electrolyte level and having also a normally open vent opening separate from the filling opening, an auxiliary cover secured to the top of the battery and having an opening affording access to the filling opening of the cell cover, and a valve supported by the cell cover for closing said vent opening while the cell is being filled, said valve having a yieldable open lower portion at all times resting on the cell cover and having an imperforate portion above the vent opening and a stem extending through the auxiliary cover and accessible from the top of the latter whereby when said stem is depressed the imperforate portion closes the vent opening and when said stem is released the vent opening is opened by spring action.

3. In a storage battery, a container having a cell compartment, a cell cover sealed in the compartment, a battery element in the compartment having one or more terminals extending through and sealed in the cell cover, said cell cover having a normally closed filling opening with an imperforate sleeve-like extension extending down from the lower side of the cover to substantially the normal electrolyte level and having also a normally open vent opening separate from the filling opening, an auxiliary cover secured to the top of the container having an opening affording access to the filling opening of the cell cover and having a depressed portion with an opening in the base thereof, and a valve supported by the the cell cover above the vent opening thereof and having a yieldable lower portion with an opening therein, an imperforate portion immediately above the vent opening and a stem extending through said second opening in the auxiliary cover and accessible from the top of the latter whereby the stem on being depressed closes the vent opening while the cell is being filled and on being released opens said vent opening by spring action.

4. In a storage battery, a container having a cell compartment, a cell cover sealed in the compartment, a battery element in the compartment having one or more terminals extending through and sealed in the cell cover, said cell cover having a normally closed filling opening with an imperforate sleeve-like extension extending down from the lower side of the cover to substantially the normal electrolyte level and having also a normally open vent opening separate from the filling opening, an auxiliary cover secured to the top of the container having an opening affording access to the filling opening of the cell cover and having a depressed portion with an opening in the base thereof, and a valve supported by the cell cover above the vent opening thereof and having a stem extending through said second opening in the auxiliary cover, said valve having an imperforate upper portion including a stem and a flexible and elastic open lower portion at all times supported by the cell cover, said stem being accessible from the top of the auxiliary cover whereby it may be depressed to cause the valve to close the vent opening while the cell is being filled and on being released said vent opening being opened by the elasticity of the lower portion of the valve.

5. In a storage battery, a container having a plurality of cell compartments, cell covers sealed in the compartments, said cell covers having normally closed filling openings with imperforate sleeve-like extensions extending down from the lower sides of said covers to substantially the normal electrolyte level and having also normally open vent openings separate from the filling openings, said filling openings being arranged in a row extending across the battery near one end thereof and the vent openings being arranged in a row extending across the battery intermediate the ends thereof, and an auxiliary cover secured to the top of the battery and serving as a protector for the different cell covers and the parts carried thereby, said auxiliary cover having adjacent one end thereof a series of openings affording access to the filling openings of the cell covers and a plurality of valves supported by the cell covers for closing the vent openings, said valves having yieldable lower portions with one or more openings therein at all times supported on the cell covers above the vent openings and having imperforate portions above the vent openings and stems extending through and accessible from the top of the auxiliary cover whereby the vent openings of the different cells may be closed while the cells are being filled and are opened by spring action.

6. In a storage battery, a container having a plurality of cell compartments, cell covers sealed in the compartments, said cell covers having normally closed filling openings with imperforate sleeve-like extensions extending down from the lower sides of said covers to substantially the normal electrolyte level and having also normally open vent openings separate from the filling openings, said filling openings being arranged in a row extending across the battery near one end thereof and the vent openings being arranged in a row extending across the battery intermediate the ends thereof, and an auxiliary cover secured to the top of the battery and serving as a protector for the different cell covers and the parts carried thereby, said auxiliary cover having adjacent one end thereof a series of openings affording access to the filling openings of the cell covers and a plurality of valves supported by the cell covers for closing the vent openings while the cells are being filled, said valves having relatively soft elastic lower ends above the vent openings with one or more openings therein and with an imperforate portion above the vent openings and with stems extending through the auxiliary cover and accessible from the top of the latter whereby they may be depressed to cause the soft lower ends of the valves to close the vent openings during the filling of the cells and when released the vent openings are opened by the spring in the rubber.

7. In a storage battery, a container having a cell compartment, a cell cover sealed in the compartment, a battery element in the compartment, said cell cover having a normally closed filling opening with an imperforate sleeve-like extension extending down from the lower side of the cover to substantially the normal electrolyte level and having also a normally open vent opening separate from the filling opening, an auxiliary cover removably secured to the top of the battery and serving as a protector for the cell cover and the parts carried thereby, said auxiliary cover having a pair of openings one affording access to the filling opening, and a valve having a lower portion with an opening therein at all times when the auxiliary cover is in place resting on the cell cover and having an imperforate upper portion with a stem extending through said other opening of the auxiliary cover and serving when actuated in one direction to close the vent opening while the cell is being filled and when released opening the vent opening by spring action, said valve being carried by and removable with said auxiliary cover when the latter is removed from the top of the battery.

JULIUS HAROLD BUSHMAN.